US011599406B2

(12) United States Patent
Grimes et al.

(10) Patent No.: US 11,599,406 B2
(45) Date of Patent: Mar. 7, 2023

(54) COMMON PLATFORM FOR FULFILLING DIFFERENT ACTIONS

(71) Applicant: Capital One Services, LLC, McLean, VA (US)

(72) Inventors: Thomas Grimes, Arlington, VA (US); Allan Jacobi, Falls Church, VA (US); Michael Williams, McLean, VA (US); Matthew Brown, Arlington, VA (US); Keegan Sullivan, Falls Church, VA (US); Kenneth Wydler, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 131 days.

(21) Appl. No.: 17/165,332

(22) Filed: Feb. 2, 2021

(65) Prior Publication Data
US 2022/0245012 A1 Aug. 4, 2022

(51) Int. Cl.
G06F 11/00 (2006.01)
G06F 11/07 (2006.01)
G06F 9/54 (2006.01)
G06F 11/32 (2006.01)

(52) U.S. Cl.
CPC ............ *G06F 11/079* (2013.01); *G06F 9/547* (2013.01); *G06F 11/0787* (2013.01); *G06F 11/327* (2013.01)

(58) Field of Classification Search
None
See application file for complete search history.

(56) References Cited

U.S. PATENT DOCUMENTS

| 10,133,650 | B1* | 11/2018 | Park | G06F 11/3684 |
| 10,296,411 | B1* | 5/2019 | Diggins | G06F 11/079 |
| 11,119,906 | B1* | 9/2021 | Edouard | G06Q 20/34 |
| 2003/0126521 | A1* | 7/2003 | Radestock | G06F 11/3688 714/E11.208 |
| 2005/0193266 | A1* | 9/2005 | Subramanian | G06F 11/3692 714/6.1 |
| 2019/0079734 | A1* | 3/2019 | Kadam | G06F 8/41 |
| 2020/0401506 | A1* | 12/2020 | Sathianarayanan | G06F 9/54 |

OTHER PUBLICATIONS

Google Scholar/Patents search—text refined (Year: 2022).*

* cited by examiner

Primary Examiner — Christopher S McCarthy
(74) Attorney, Agent, or Firm — Harrity & Harrity, LLP

(57) ABSTRACT

In some implementations, a device may receive action information, for an action from multiple actions, that indicates at least one of code associated with the action or one or more inputs required to complete the action. The device may receive workflow information, for a workflow included in a set of workflows, that indicates one or more actions from the multiple actions and an order in which the one or more actions are to be completed for the workflow. The device may receive, via an application programming interface (API) call, a request to complete the workflow The device may identify the workflow information associated with the workflow in a data structure. The device may perform the workflow based on the workflow information and the one or more inputs by executing code for the one or more actions indicated by the workflow information and in the order indicated by the workflow information.

20 Claims, 7 Drawing Sheets

COMMON PLATFORM FOR FULFILLING DIFFERENT ACTIONS

BACKGROUND

An application programming interface (API) is a tool that provides machine-to-machine communication. For example, an API may be a computing interface that defines interactions between multiple devices. An API may define the types of calls or requests that can be made, how to make the calls or request, the data formats that should be used, and/or the conventions to follow, among other examples.

SUMMARY

In some implementations, a system for providing a common application programming interface (API) for executing different procedures includes one or more memories and one or more processors, communicatively coupled to the one or more memories, configured to: store code, associated with performing an action, in an action database, wherein the action database stores code for multiple actions; obtain information, for a set of procedures, including procedure information for a procedure, of the set of procedures, that indicates at least one of: input information, associated with the procedure, that indicates one or more inputs for the API associated with the procedure, a set of actions, from the multiple actions identified in the action database, associated with the procedure, an order that the set of actions are to be executed for the procedure, or failure information, for each action included in the set of actions, that indicates whether the procedure is to continue if an action included in the set of action fails; receive, via an API call, a request to execute the procedure, wherein the request indicates the procedure and values or information for the one or more inputs for the API; execute the procedure based on the procedure information and the one or more inputs, wherein executing the procedure includes executing code for at least one action included in the set of actions; and create a monitoring record associated with the request, based on executing the procedure, that indicates information generated by executing the procedure.

In some implementations, a method for providing a generic platform for completing different workflows includes receiving, by a device, first information associated with performing multiple actions, wherein the information includes action information, for an action included in the multiple actions, that indicates at least one of code associated with the action or one or more inputs required to complete the action; receiving, by the device, second information for a set of workflows, including workflow information, for a workflow included in the set of workflows, that indicates one or more actions from the multiple actions and an order in which the one or more actions are to be completed for the workflow; storing, by the device, the first information associated with performing the multiple actions and the second information for the set of workflows in a data structure; receiving, by the device, a request to complete the workflow included in the set of workflows, wherein the request indicates the workflow and one or more inputs associated with the workflow; identifying, by the device, the workflow information associated with the workflow in the data structure; performing, by the device, the workflow based on the workflow information and the one or more inputs, wherein performing the workflow includes iteratively executing code for the one or more actions indicated by the workflow information and in the order indicated by the workflow information; and generating, by the device, monitoring information associated with the request based on performing the workflow that indicates output information of the workflow and a result of performing the workflow.

In some implementations, a non-transitory computer-readable medium storing a set of instructions includes one or more instructions that, when executed by one or more processors of a device, cause the device to: obtain first information, for multiple actions, that includes action information for an action, included in the multiple action, that indicates code associated with executing the action and one or more inputs required to execute the action; obtain second information, for a set of workflows, that includes workflow information for a workflow, included in the set of workflows, that indicates one or more actions from the multiple actions and an order in which the one or more actions are to be completed; store, in a database, the first information for the multiple actions and the second information for the set of workflows; receive, via an API call, a request to complete the workflow included in the set of workflows, wherein the request indicates the workflow and one or more inputs for an API; identify, in the database, the workflow information associated with the workflow; execute code for the one or more actions indicated by the workflow information in the order indicated by the workflow information; and generate a monitoring report associated with the request based on executing the code that indicates an outcome of executing the code for the one or more actions.

DETAILED DESCRIPTION

Figure 1A:
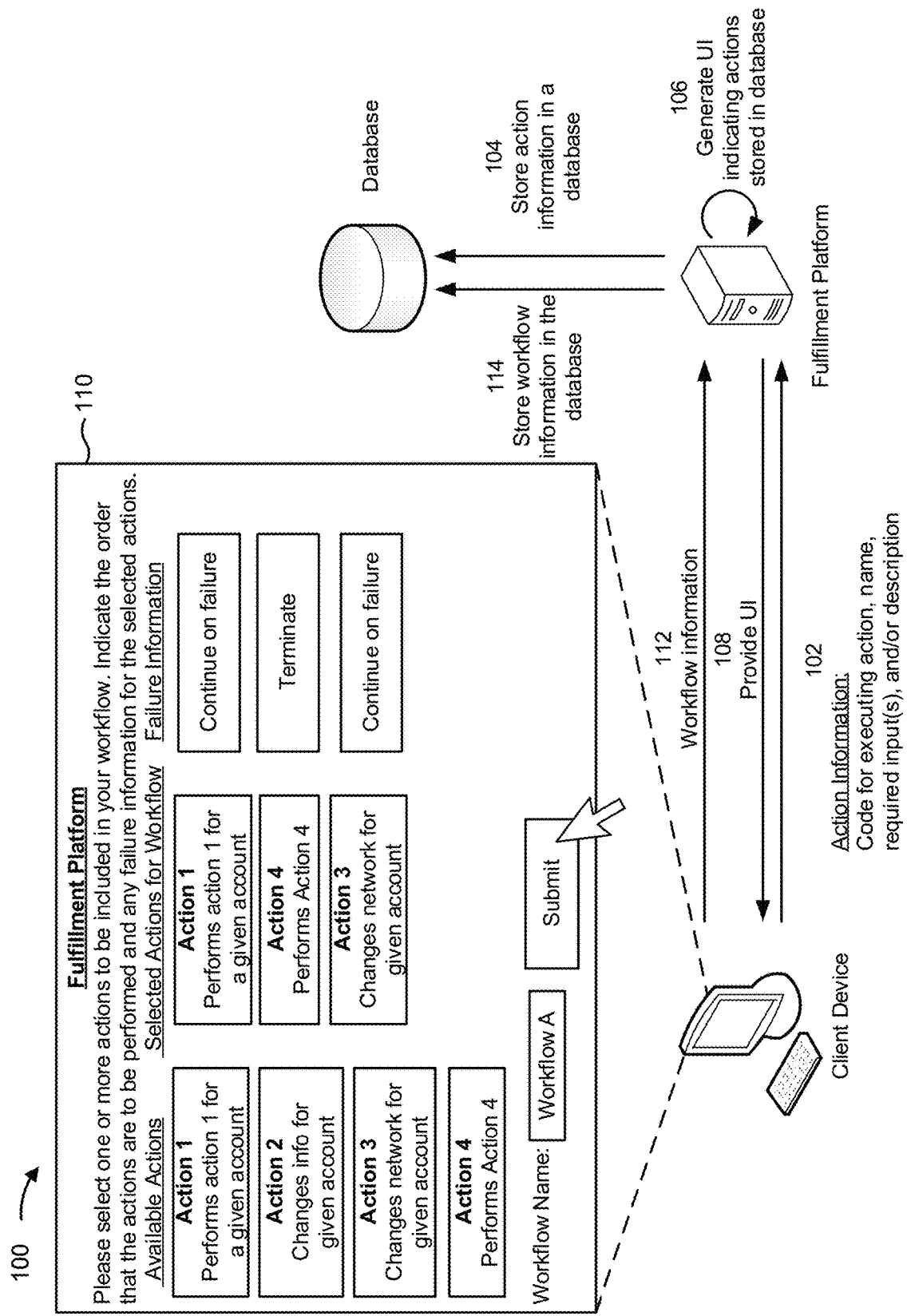
FIGS. 1A-1D are diagrams of an example implementation relating to a common platform for fulfilling different actions.

The following detailed description of example implementations refers to the accompanying drawings. The same reference numbers in different drawings may identify the same or similar elements.

In some cases, an entity may need to perform many actions (e.g., hundreds, thousands, and/or millions) over a short period of time (e.g., in one day). A fulfillment platform or an application programming interface (API) may be used by an entity (e.g., a user and/or a company) to fulfill or execute the actions without requiring a user to manually perform each action. For example, an API can be used to define interactions between multiple devices to complete the different actions. The API can obtain and/or execute code that causes the different actions to be performed or completed. However, the entity may need to create the API to perform the actions or workflow (e.g., a set of one or more actions). This may require a user to create or generate code for the actions. Additionally, infrastructure for the API needs to be established (e.g., servers, databases, and/or user interfaces). Creating the API consumes significant time (e.g., to program the code and create the infrastructure) as well as computing resources (e.g., processing resources and/or network resources) associated with coding and/or establishing the API infrastructure. Once the API is created, the entity is required to maintain the API infrastructure. Moreover, if the entity needs to perform a different action or a different workflow, the entity is required to create or build a new API for the different action or different workflow. As a result, the entity is required to establish and maintain infrastructure for each API or each fulfillment platform that is created by the entity. This creates a significant maintenance overhead and consumes resources (e.g., time resources and/or computing resources) associated with maintaining the infrastructure for multiple APIs or multiple fulfillment platforms.

In some cases, an API can be created that includes a set of endpoints to other APIs or other programs for completing different actions or workflows, such that a user can use the API to perform the different actions or different workflows (e.g., through an API call to the other APIs identified). For example, the API can leverage the set of endpoints to perform different actions or different workflows by communicating with other APIs or other programs. However, each of the APIs or programs identified by the set of endpoints are still required to be independently maintained. Such an API may enable a user to perform different actions or workflows (e.g., by communicating with other APIs or other programs), but a maintenance overhead associated with maintaining the separate infrastructure for each associated API or program remains significant.

Some implementations described herein enable a common platform for fulfilling different actions. The platform may be an API. The platform may obtain action information (e.g., code, descriptions, and/or required inputs) for multiple actions. The platform may obtain workflow information (e.g., one or more actions (from the multiple actions), an order of the actions, and/or failure information) for multiple workflows. The platform may maintain and/or store the action information and the workflow information using a common infrastructure (e.g., one or more databases or servers). The platform may receive a request to perform a workflow (e.g., via an API call). The platform may identify the workflow indicated by the request (e.g., from the stored workflow information). The platform may identify the action information for the actions indicated by the workflow information. The platform may execute code for the actions (e.g., in an order indicated by the workflow information) to perform or execute the workflow. The platform may perform a similar procedure to perform or execute other workflows maintained or stored by the platform. As a result, the platform may provide a single infrastructure for maintaining and performing multiple workflows. This reduces a maintenance overhead and conserves resources (e.g., time resources and/or computing resources) that would have otherwise been used to create, establish, and/or maintain separate platforms and/or separate APIs. For example, once action information and/or workflow information is provided to the platform by an entity, no additional maintenance or resources are required from the entity.

Additionally, the common platform enables uniform monitoring across multiple workflows or actions. For example, the common platform may create a monitoring record or monitoring report based on performing or executing a workflow. The platform may identify failed actions and/or failed workflow attempts based on the monitoring and may automatically retry to perform or execute the failed actions and/or failed workflow attempts. Additionally, or alternatively, the platform may transmit, to a device associated with a user who made the request to perform the workflow, an indication of the failed actions and/or failed workflow attempts to alert of notify the user of the failures. Separate APIs or separate platforms to perform or execute different workflows may have different types of monitoring, different levels of monitoring, and/or no monitoring at all. The uniform monitoring across multiple workflows or actions ensures that each workflow executed or performed by the platform is monitored to a level required by the entity associated with the platform. This ensures that the different workflows are successfully completed and/or that a user is promptly notified of any failed workflow attempts. This conserves resources (e.g., time resources, computing resources, and/or monetary resources) that would have otherwise been consumed in association with a failed workflow that was not identified by a user. Moreover, in some cases, a failed workflow attempt may introduce liability (e.g., monetary liability and/or legal liability) for an entity. The uniform monitoring reduces the risk of liability associated with failed workflow attempts.

FIGS. 1A-1D are diagrams of an example 100 associated with a common platform for performing different actions. As shown in FIGS. 1A-1D, example 100 includes a fulfillment platform, a client device, one or more databases, and/or one or more data sources. These devices are described in more detail in connection with FIGS. 2 and 3.

As shown in FIG. 1A, and by reference number 102, the fulfillment platform may receive, from the client device, action information for an action. The action may be any action, task, and/or step that can be performed or automated via code and/or an API. For example, the action may include obtaining, accessing, modifying, removing, and/or adding data that is stored in a database. In some implementations, the action may be communicating with an API (e.g., a simple object access protocol (SOAP) API and/or or a representational state transfer (REST) API) to request that the API complete a task or action. In some implementations, the action may be communicating with a device or database. For example, the action may be modifying account information for an account, updating or modifying a record or ledger, and/or transmitting a message to a device, among other examples.

The action information may include code that, when executed by a device (e.g., a processor, the client device, and/or another device), causes the device to perform the action. The code may be executable code, source code, software code, and/or hardware code. In some implementations, the code may be C code, C++ code, SystemC code, Ada code, Java code, Structured Text, a hardware description language code (e.g., Very High Speed Integrated Circuit (VHSIC) Hardware Description Language (VHDL)), Pascal code, formula translation (FORTRAN) code, Verilog code, and/or a concurrent language code, among other examples. In some implementations, the client device may provide the code to a code hosting platform. The fulfillment platform may obtain (e.g., pull) the code from the code hosting platform.

The action information may include descriptive information associated with the action and/or the code. The descriptive information may include a name of the action, a description of the action, and/or notes associated with the action and/or the code, among other examples. The descriptive information may enable the action information and/or the code to be self-documenting. For example, the descriptive information may follow naming conventions and/or structured programming conventions that enable a function or process of the action to be obtained without additional documentation or input. As the action information and/or the code may be self-documenting, a user interface can be generated by the fulfillment platform (e.g., as described in more detail below) that indicates the descriptive information associated with the action. By presenting the descriptive information for display, the user interface may enable the function or process of the action to be presented to a user without requiring additional documentation or input from the client device.

The action information may include an indication of one or more inputs that are required to perform the action. An input may be a value, an address, and/or information associated with the action, among other examples. For example, for an action associated with an account, an input may include an account identifier, a value that information of the account is to be modified to, and/or an indication of information to be modified for the account. For an action associated with transmitting a message, an input may include an address (e.g., physical address, email address, and/or a virtual address), a content of the message, and/or a timing of the message, among other examples.

In some implementations, the action information may include security information associated with the action information. The security information may indicate one or more permitted users, or a group of permitted users, that are permitted to access and/or perform the action. For example, in the context of creating a workflow (e.g., as described in more detail below), the security information may indicate users that are permitted to add the action to a workflow. In some implementations, the security information may indicate users that are permitted to request that the action be performed.

In some implementations, the action information may include an indication of whether the action is to be performed in a batch action (e.g., a batch action indication). A batch action may include performing an action using a batch processing technique. For example, some actions may be performed in batches (e.g., rather than each time the action is requested) to conserve computing resources and/or processing resources. The batch action indication may indicate that the action is to be performed in a batch action. In some implementations, the action information may include an indication of data that is to be stored or monitored when the action is performed or executed. For example, the action information may include an indication of data or values that are to be stored by the fulfillment platform when the action is performed or executed to assist with monitoring a status of the action (e.g., as described in more detail below).

As shown by reference number 104, the fulfillment platform may store the action information in a database. The fulfillment platform may receive action information for other actions in a similar (or the same) manner as described above. Therefore, the fulfillment platform may store action information for multiple actions in the database.

As shown by reference number 106, the fulfillment platform may generate a user interface indicating one or more (or all) of the actions stored in the database. The user interface may indicate the descriptive information associated with one or more (or all) of the actions stored in the database. The user interface may enable a user to interact with the user interface to create a workflow that includes one or more actions (e.g., as described in more detail below). For example, the fulfillment platform may generate the user interface to indicate, for an action, a name of the action, a description of the action, notes associated with the action, and/or required inputs associated with the action. In this way, the user interface may display a function or process that the action performs such that a user is enabled to identify the function or process that the action performs without having to inspect the code associated with the action or without having to obtain additional information. As a result, the fulfillment platform makes data easier to access by enhancing a user interface, thereby improving a user experience, enhancing user-friendliness of a client device and the user interface, and improving the ability of a user to use the client device to generate and/or perform workflows. In some implementations, action information is presented in a unified manner at a relevant time via the user interface (as opposed to a scenario where action information is presented on separate web pages of different platforms at irrelevant times), thereby further improving access to the action information. Additionally, the fulfillment platform may improve data security by generating the user interface such that only permitted users (e.g., indicated by the security information) can access or view action information via the user interface.

In some implementations, the fulfillment platform may automatically update or modify the user interface when the fulfillment platform obtains new action information. For example, the client device may provide action information to the fulfillment platform (or directly to the database or a code hosting platform). The fulfillment platform may identify the new action information and may update or modify the user interface based on the new action information. For example, the fulfillment platform may modify a document (e.g., a document object model (DOM)) used to generate the user interface to indicate the new action information (e.g., descriptive information of the new action information).

As shown by reference number 108, the fulfillment platform may provide the user interface to the client device to enable the user interface to be displayed by the client device. For example, the fulfillment platform may provide the document (e.g., the DOM) used to generate the user interface to the client device. As shown by reference number 110, the client device may provide the user interface for display via the client device.

A user of the client device may interact with the user interface to create a workflow. As described above, a workflow may include one or more actions that are to be performed or executed to complete the workflow. In some implementations, the workflow may indicate an order in which the one or more actions are to be performed. In some implementations, the workflow may indicate that the one or more actions may be performed in any order. In some implementations, the workflow may indicate failure information for each action included in the workflow. The failure information may indicate a failure operation to be performed if the action fails (e.g., an action to be performed by the fulfillment platform upon a failure). For example, the failure operation may indicate whether the workflow is to continue upon a failure of the action. For example, for an action included in the workflow, the failure information may indicate that the workflow is to continue on a failure of the action or terminate on a failure of the action. In some implementations, failure information may be associated with multiple actions included in the workflow. For example, the failure information may indicate that the workflow is to terminate upon a failure of any of the actions included in the multiple actions. The user of the client device may interact with the user interface to input workflow information (e.g., one or more actions, an order of the one or more actions, and/or failure information) for a workflow.

For example, as shown in FIG. 1A, the user interface may display four available actions (e.g., Action 1, Action 2, Action 3, and Action 4). The user of the client device may interact with the user interface to select one or more of the available actions to be included in a workflow. For example, as shown in FIG. 1A, the user may interact with the user interface (e.g., input, click, and/or drag and drop) Action 1, Action 3, and Action 4 to be included in the workflow. Additionally, the user may interact with the user interface to indicate an order that the selected actions are to be performed in the workflow. For example, the user may interact with the user interface to indicate that the order of the actions for the workflow is to be Action 1, followed by Action 4, followed by Action 3. Further, as shown in FIG. 1A, the user may interact with the user interface to input failure information for one or more (or all) of the actions selected for the workflow. For example, the user may input that the failure information for Action 1 is "Continue on failure" (e.g., indicating that if Action 1 is not successfully completed, then the device performing or executing the workflow should proceed to Action 4). The user may input that the failure information for Action 4 is "Terminate" (e.g., indicating that if Action 4 is not successfully completed, then the device performing or executing the workflow should not proceed to Action 3). The user may input that the failure information for Action 3 is "Continue on failure" (e.g., indicating that if Action 3 is not successfully completed, then the device performing or executing the workflow should proceed to complete the workflow).

As described above, the workflow may be associated with one or more inputs (e.g., one or more inputs required to perform or execute the workflow). The one or more inputs for the workflow may be based on the selected actions for the workflow. For example, as described above, an action may be associated with one or more inputs. The one or more inputs for the workflow may combine the inputs for each action included in the workflow. For example, Action 1 may be associated with input A and input B, Action 4 may be associated with no inputs, and Action 3 may be associated with input A and input C. Therefore, the inputs associated with the workflow may be input A, input B, and input C. In some implementations, one or more inputs for the workflow may be indicated in the workflow information (e.g., via the user interface) that is not associated with an action. For example, a user may indicate an input for the workflow (e.g., rather than the inputs being based only on the inputs for the actions included in the workflow).

As shown in FIG. 1A, the user may input descriptive information for the workflow. For example, the user may input a name of the workflow (e.g., Workflow A), a description of the workflow, and/or notes associated with the workflow. The descriptive information may enable the fulfillment platform to generate the user interface (or another user interface) to display the descriptive information for one or more workflows. For example, the descriptive information for a workflow may include a function or purpose of the workflow (e.g., a description of the workflow), a name of the workflow, and/or one or more actions included in the workflow (e.g., and an order of the one or more actions), among other examples.

In some implementations, workflow information for the workflow (e.g., Workflow A) may indicate security information for the workflow. The security information may indicate one or more permitted users, or a group of permitted users, that are permitted to access and/or perform the workflow. In some implementations, the security information may indicate users that are permitted to request that the workflow be performed.

In some implementations, workflow information for the workflow (e.g., Workflow A) may indicate target information for the workflow. The target information may indicate an expected or desired outcome of performing or executing the workflow. The target information may be used by the fulfillment platform for monitoring purposes and/or to ensure that a workflow is successfully completed (e.g., as explained in more detail below). For example, for a workflow associated with changing an account type of an account (e.g., to a Type A account), the target information may indicate the expected account type of the account after the workflow is performed or executed (e.g., Type A). In some implementations, the target information may be indicated (e.g., partially or in whole) by a request to perform or execute an action and/or workflow (e.g., as described in more detail below). For example, the request may indicate a target value or target information associated with performing or executing the action and/or workflow (e.g., as an input). Therefore, in some implementations, an input associated with (e.g., required by) a workflow may include target information for the workflow.

In some implementations, the fulfillment platform may enable a user (via the user interface) to test the workflow. For example, the user interface may include fields for test inputs to be provided by the user that are based on the one or more actions included in the workflow. This enables the user to view what the identified inputs for the workflow are and to see what a sample request or query would look like. The user may provide test inputs to the client device, via the user interface, to test if the created workflow performs successfully. The client device may communicate (e.g., via an API call or a request) to perform the test of the created workflow using the test inputs (e.g., as described in more detail below). The fulfillment platform may provide one or more outputs generated based on the test inputs and based on performing the workflow to the client device to be displayed by the user interface. This enables the user to quickly identify if the created workflow functions as intended without having to fully deploy the workflow (e.g., by leveraging the existing infrastructure provided by the fulfillment platform to test the created workflow). This conserves resources that would have otherwise been used to create and/or establish the required infrastructure to test the created workflow and/or that would have otherwise been used deploying a workflow that does not function as intended.

As shown by reference number 112, the fulfillment platform may receive, from the client device, an indication of the workflow information for the workflow. For example, the workflow flow information may include the one or more actions included in the workflow, the order of the one or more actions, one or more inputs for the workflow, failure information for the workflow, descriptive information for the workflow, security information for the workflow, and/or target information for the workflow, among other examples. In some implementations, the workflow information may be input (e.g., partially or in whole) via the user interface displayed by the client device. In some implementations, the workflow information may be obtained by the client device based on an input provided by the user (e.g., code or another input and/or based on information provided to the client device by the fulfillment platform (e.g., action information or other information)).

In some implementations, the fulfillment platform may determine or identify workflow information for the workflow based on information provided by client device. For example, the client device may indicate the one or more actions to be included in the workflow. The fulfillment platform may identify the one or more inputs for the workflow based on action information (e.g., stored by the fulfillment platform in the database) for each action included in the workflow.

As shown by reference number 114, the fulfillment platform may store the workflow information for the workflow in the database (or in another database). The fulfillment platform may obtain workflow information for other workflows in a similar (or the same) manner as described above. For example, the fulfillment platform may obtain workflow information for a second workflow (e.g., that includes one or more actions stored by the fulfillment platform). In this way, the fulfillment platform may enable multiple workflows to be created or generated using the same infrastructure (e.g., using the fulfillment platform and the database(s)). For example, the fulfillment platform may enable different workflows to be created using the actions stored by the fulfillment platform. In this way, users may leverage the existing infrastructure (e.g., the fulfillment platform and the stored action information) to easily and quickly create different workflows without establishing or creating separate infrastructure required to store, perform, and/or execute the different workflows.

In some implementations, the fulfillment platform may update or modify the user interface (or another user interface) based on the workflow information stored by the fulfillment platform. For example, the fulfillment platform may modify a document (e.g., a DOM) used to generate the user interface to indicate the workflow information for the workflow. In this way, the fulfillment platform may enable a user to identify available and/or previously created workflows that are stored by the fulfillment platform. This may improve a user experience, enhance user-friendliness of the client device and the user interface, and improve the ability of a user to use the client device to generate and/or perform workflows. In some implementations, workflow information is presented in a unified manner to enable a user to identify and use a previously generated workflow. This may conserve resources that would have otherwise been used to create, communicate, and/or store the workflow information for the workflow.

Figure 1B:
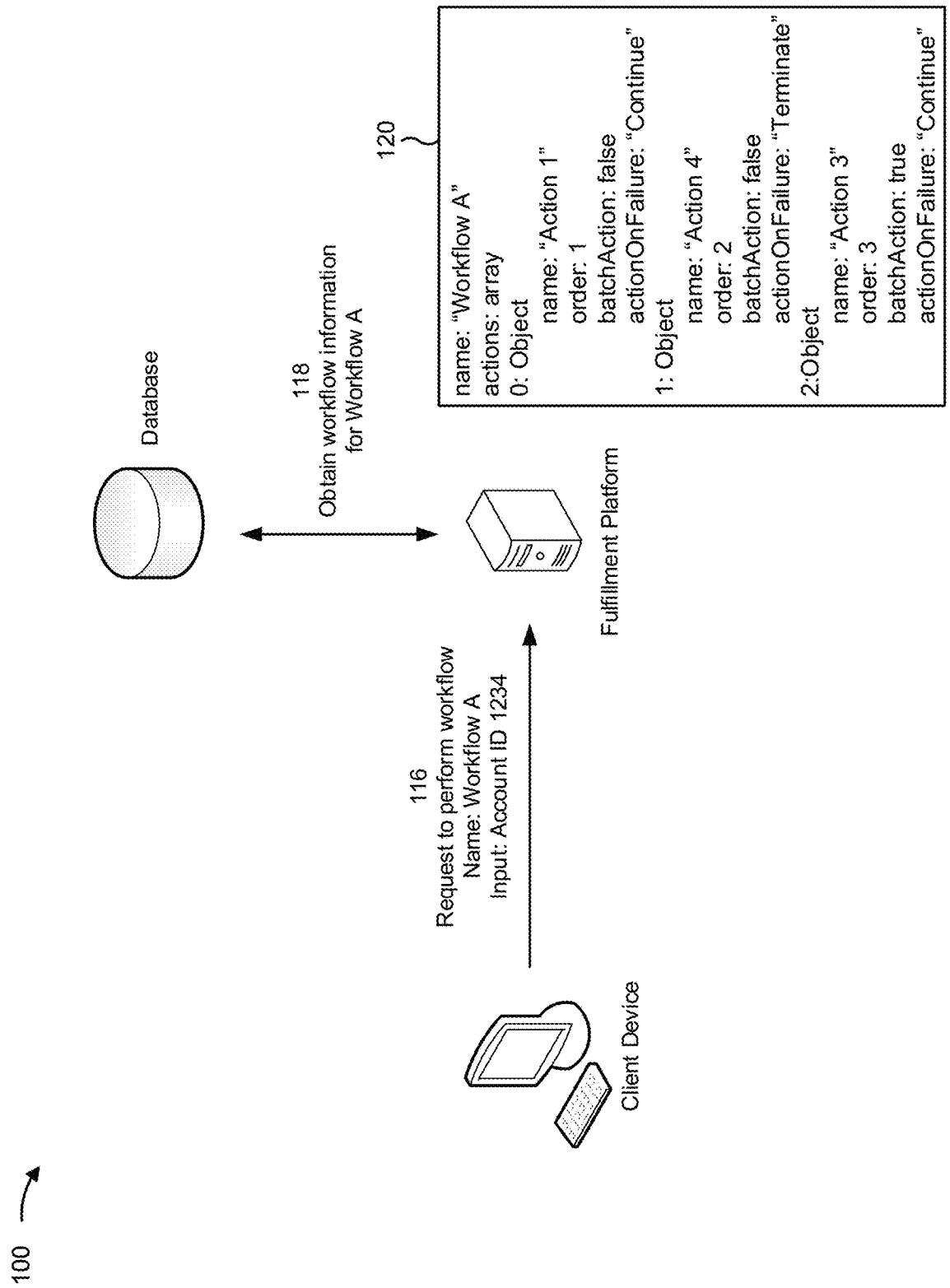

As shown in FIG. 1B, and by reference number 116, the fulfillment platform may receive, from the client device (or another client device), a request to perform a workflow. The request may indicate an identifier of the workflow (e.g., Workflow A) and one or more inputs (e.g., account identifier (ID) 1234). The fulfillment platform may receive the request via an API call (e.g., the fulfillment platform may be a fulfillment API). In some implementations, the fulfillment platform may receive the request from another API (e.g., the other API may transmit the request or API call to the fulfillment platform).

As shown by reference number 118, the fulfillment platform may obtain the workflow information for the workflow identified by the request (e.g., Workflow A) from the database. The fulfillment platform may determine whether the workflow identified by the request is a valid workflow. For example, the fulfillment platform may determine whether workflow information associated with the identifier of the workflow (e.g., Workflow A) is stored by the fulfillment platform (e.g., in the database). The fulfillment platform may search or parse the workflow information stored in the database to identify workflow information associated with the identifier included in the request. If the fulfillment platform is unable to identify workflow information associated with the identifier included in the request, then the fulfillment platform may determine that the request (and/or the workflow indicated by the request) is not valid. The fulfillment platform may transmit an indication to the client device that the request (and/or the workflow indicated by the request) is not valid. If the fulfillment platform is able to identify workflow information associated with the identifier included in the request, then the fulfillment platform may access or obtain the workflow information from the database.

For example, as shown by reference number 120, the fulfillment platform may identify the workflow information for Workflow A (e.g., the workflow indicated by the request). As described above, the workflow information may indicate one or more actions included in the workflow, an order of the one or more actions, a batch action indication for one or more of the actions (e.g., batchAction), and/or failure information for one or more of the actions (e.g., actionOnFailure), among other examples.

The fulfillment platform may identify one or more inputs associated with the workflow based on accessing or obtaining the workflow information from the database. The fulfillment platform may determine whether the request indicates a value or information for each input associated with the workflow. In other words, the fulfillment platform may determine whether the request has provided information for each input required to perform or execute the workflow. For example, an input associated with Workflow A may be an account identifier. The fulfillment platform may determine whether the request has indicated an input for an account identifier (e.g., account ID 1234). If the fulfillment platform determines that the request does not indicate an input for an account identifier, then the fulfillment platform may determine that the request is not valid and may not proceed with performing or executing the workflow (e.g., and/or may transmit, to the client device, an indication that the request is not valid). If the fulfillment platform determines that the request does indicate an input for an account identifier, then the fulfillment platform may proceed with performing or executing the workflow. This conserves resources (e.g., computing resources and/or network resources) that would have otherwise been used to perform or execute the workflow without information for a required input.

In some implementations, the fulfillment platform may determine whether information for an input indicated by the request is valid. For example, for an input of an account identifier, the fulfillment platform may determine whether the account identifier indicated by the request (e.g., 1234) is valid (e.g., by communicating with a device associated with an entity that provides the account and/or by searching or parsing another database for the account identifier). As another example, for an input of an email address, the fulfillment platform may determine whether the email address indicated by the request is valid (e.g., by performing a syntax check, a domain check to determine if the domain address of the email address is valid, and/or an email ping to a server device to determine if the email address is valid). If the fulfillment platform determines that the information for an input indicated by the request is not valid, then the fulfillment platform may not proceed with performing or executing the workflow (e.g., and/or may transmit, to the client device, an indication that the request is not valid). This conserves resources (e.g., computing resources and/or network resources) that would have otherwise been used to perform or execute the workflow with information for a required input that is not valid.

In some implementations, the fulfillment platform may determine whether a user or the client device associated with the request is authorized to make the request. The fulfillment platform may identify one or more authorized users and/or authorized devices based on security information associated with the workflow and/or with an action included in the workflow. The fulfillment platform may determine whether the user or the client device associated with the request is authorized to make the request based on the security information. If the fulfillment platform determines that the user or the client device associated with the request is not authorized to make the request, then the fulfillment platform may not proceed with performing or executing the workflow (e.g., and/or may transmit, to the client device, an indication that the request is not valid).

In some implementations, the fulfillment platform may identify one or more use parameters associated with the workflow (and/or an action included in the workflow). A use parameter may be a parameter that limits a use of the workflow and/or an action included in the workflow. A use parameter may include a cap parameter and/or a rate parameter, among other examples. The cap parameter may indicate a permissible number of requests associated with the workflow and/or action permitted over a time period (e.g., per hour, per day, and/or per week). The rate parameter may indicate a permissible rate of requests associated with the workflow and/or the action. For example, the fulfillment platform and/or another device associated with performing the workflow and/or the action may be associated with a maximum rate of requests (e.g., the other device associated with performing the workflow and/or the action be capable of performing or executing 10 requests each second).

The fulfillment platform may determine whether the request can be completed based on the one or more use parameters. For example, the fulfillment platform may determine whether the cap parameter for the workflow and/or an action included in the workflow is satisfied. That is, the fulfillment platform may determine whether the maximum number of requests indicated by the cap parameter has been reached. In some implementations, the fulfillment platform may determine whether the rate parameter for the workflow and/or an action included in the workflow is satisfied. If the fulfillment platform determines that a use parameter associated with the workflow and/or an action included in the workflow is not satisfied, then the fulfillment platform may not proceed with performing and/or executing the workflow. For example, the fulfillment platform may determine that the request is not valid and/or may determine that the request is to be delayed (e.g., until the use parameter that is not satisfied can be satisfied).

Figure 1C:
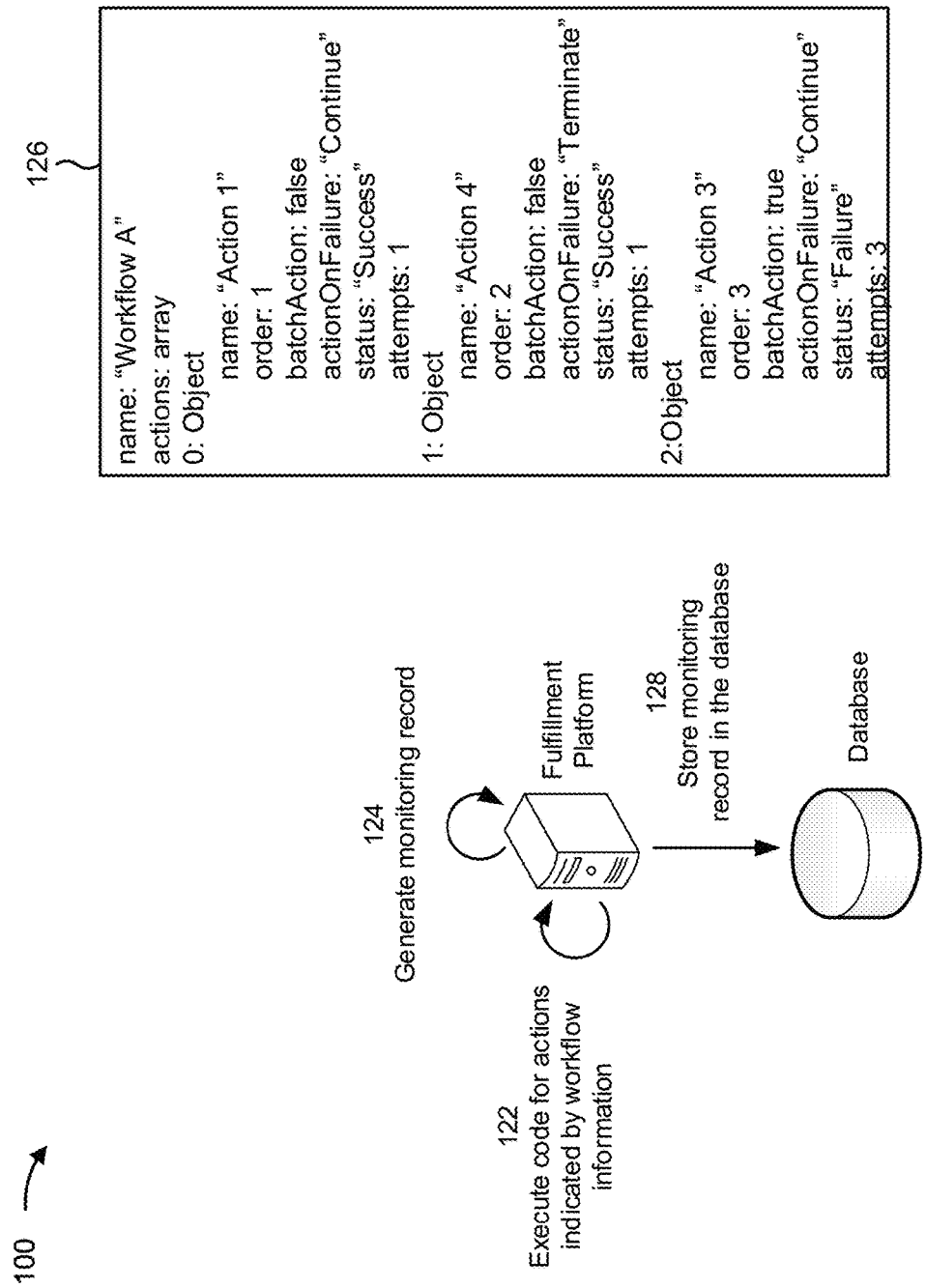

As shown in FIG. 1C, if the fulfillment platform determines that the workflow is to performed or executed (e.g., as described above), then the fulfillment platform may identify code for each action included in the workflow (e.g., based on action information for each action stored by the fulfillment platform). As shown by reference number 122, the fulfillment platform may execute code for the action(s) included in the workflow (e.g., indicated by the workflow information). For example, the fulfillment platform may iteratively execute code for the action(s) included in the workflow based on the order of the actions indicated by the workflow information. The fulfillment platform may determine whether to proceed with executing code for subsequent actions (e.g., after a first action) based on whether the first action is successfully completed and/or based on the failure information associated with the first action.

For example, for Workflow A, the fulfillment platform may obtain the code for performing Action 1. The fulfillment platform may execute the code for performing Action 1. The fulfillment platform may determine whether Action 1 has been successfully completed (e.g., based on the code successfully executing, based on an indication from another device, and/or based on an output generated from executing the code). If the fulfillment platform determines that Action 1 has been successfully completed, then the fulfillment platform may proceed with executing the code for Action 4 (e.g., the next action in Workflow A after Action 1 as indicated by the order of the actions for Workflow A) in a similar manner. If the fulfillment platform determines that Action 1 has not been successfully completed, then the fulfillment platform may determine whether to proceed with executing the code for Action 4 based on the failure information associated with Action 1. As shown in FIG. 1C, the failure information for Action 1 indicates that the workflow is to continue to Action 1 fails. Therefore, if fulfillment platform determines that Action 1 has not been successfully completed, then the fulfillment platform may proceed with executing the code for Action 4.

In some implementations, the fulfillment platform may determine that an action has not been successfully completed (e.g., may determine that an action has failed) based on executing the code for the action. The fulfillment platform may automatically attempt to retry to perform the action based on determining that the action has not been successfully completed. For example, the fulfillment platform may execute the code for the action a second time action based on determining that the action has not been successfully completed after executing the code a first time. In some implementations, the fulfillment platform may retry to perform the action number of times before determining whether to proceed with executing the code for a subsequent action in the workflow based on the failure information associated with action. For example, the fulfillment platform may attempt to execute the code for the action three times before determining whether to proceed with executing the code for the subsequent action in the workflow based on the failure information associated with action.

If failure information for an action indicates that the workflow is to terminate if the action fails and the fulfillment platform determines that action has not been successfully completed (e.g., after retying to execute the code a number of times, as described above), then the fulfillment platform may terminate the workflow and may not proceed with executing the subsequent action in the workflow. The fulfillment platform may retry to perform or execute the workflow at a later time. The fulfillment platform may transmit, to the client device associated with the request, an indication that the workflow was terminated (e.g., not successfully completed).

As shown by reference number 124, the fulfillment platform may generate a monitoring record based on performing or executing the workflow, as described above. The monitoring record may be used by the fulfillment platform or another device to determine whether the workflow has been successfully completed and/or to identify failures within the workflow. As shown by reference number 126, the monitoring record may indicate workflow information associated with the workflow (e.g., descriptive information, the one or more actions, the order of the one or more actions, and/or the failure information for the one or more actions). The monitoring record may indicate an identifier for the workflow attempt (e.g., indicating the specific attempt to perform or execute the workflow associated with the monitoring record). The monitoring record may indicate a status of the actions included in the workflow (e.g., success or failure) based on executing the code for the actions, as described above. For example, as shown in FIG. 1C, the monitoring record may indicate that Action 1 and Action 4 were successfully completed with one attempt. The monitoring record may indication that Action 3 was not successfully completed, and that the fulfillment platform attempted to complete Action 3 three times. The monitoring record may enable the fulfillment platform, another device, and/or a user to easily and quickly identify a failed action (e.g., Action 3) in the workflow. As a result, the fulfillment platform may be enabled to retry to perform the failed action at a later time without requiring an input or a second request. Additionally, or alternatively, a user associated with the request to perform the workflow may be enabled to quickly identify the failed action and manually resolve any issues associated with the failed action (or the code for performing the failed action) and/or may request that the failed action or the workflow be performed by the fulfillment platform a second time. By enabling the fulfillment platform and/or the user associated with the request to quickly identify a failed action, the monitoring record enables resources (e.g., computing resources, network resources, and/or monetary resources) to be conserved that would have otherwise been consumed or lost based on the failed action.

In some implementations, the monitoring record may indicate one or more outputs generated based on performing the workflow and/or based on performing an action included in the workflow. The one or more outputs may be used by the fulfillment platform when determining whether the workflow and/or an action was successfully completed based on comparing the output to target information associated with the workflow and/or the action. Additionally, or alternatively, the one or more outputs may be used by a user associated with the request to perform the workflow to monitor and/or determine if the workflow and/or an action was successfully completed based on the one or more outputs.

An output may include one or more data points, an account type that an account was changed to, an input provided to another device, information associated with an account that has been changed (e.g., a new credit line value for an account and/or a new spending limit for an account), a message that was transmitted to another device and an address that the message was transmitted to, and/or information that was added to a record or database. For example, an action may be associated with transmitting a prescription for a patient to a device associated with a pharmacy. The output may include the prescription that was indicated in a message to the pharmacy, an identifier associated with the pharmacy, and/or an address (e.g., of the device associated with the pharmacy and/or of an email associated with the pharmacy) to which the message was transmitted. As another example, an action may be associated with adding information to a record associated with an individual that is stored in a database. The output may include an identifier of the record that was modified (e.g., an identifier of the individual) and/or the information that was added to the record.

As shown by reference number 128, the fulfillment platform may store the monitoring record in the database (or another database). This may enable the fulfillment platform or another device to quickly access or obtain the monitoring record at a later time. For example, the fulfillment platform (or another device) may search or parse the database for the identifier of the workflow attempt.

In some implementations, if an action included in the workflow is to be performed in a batch action, the fulfillment platform may store (e.g., in a database) or transmit (e.g., to another device) an indication of the action and/or one or more inputs for the action that is to be performed in a batch action. This enables the fulfillment platform (or another device) to obtain information (e.g., inputs) for multiple actions and perform the multiple actions in a single batch action, thereby conserving resources that would have otherwise been used performing each action individually.

Figure 1D:
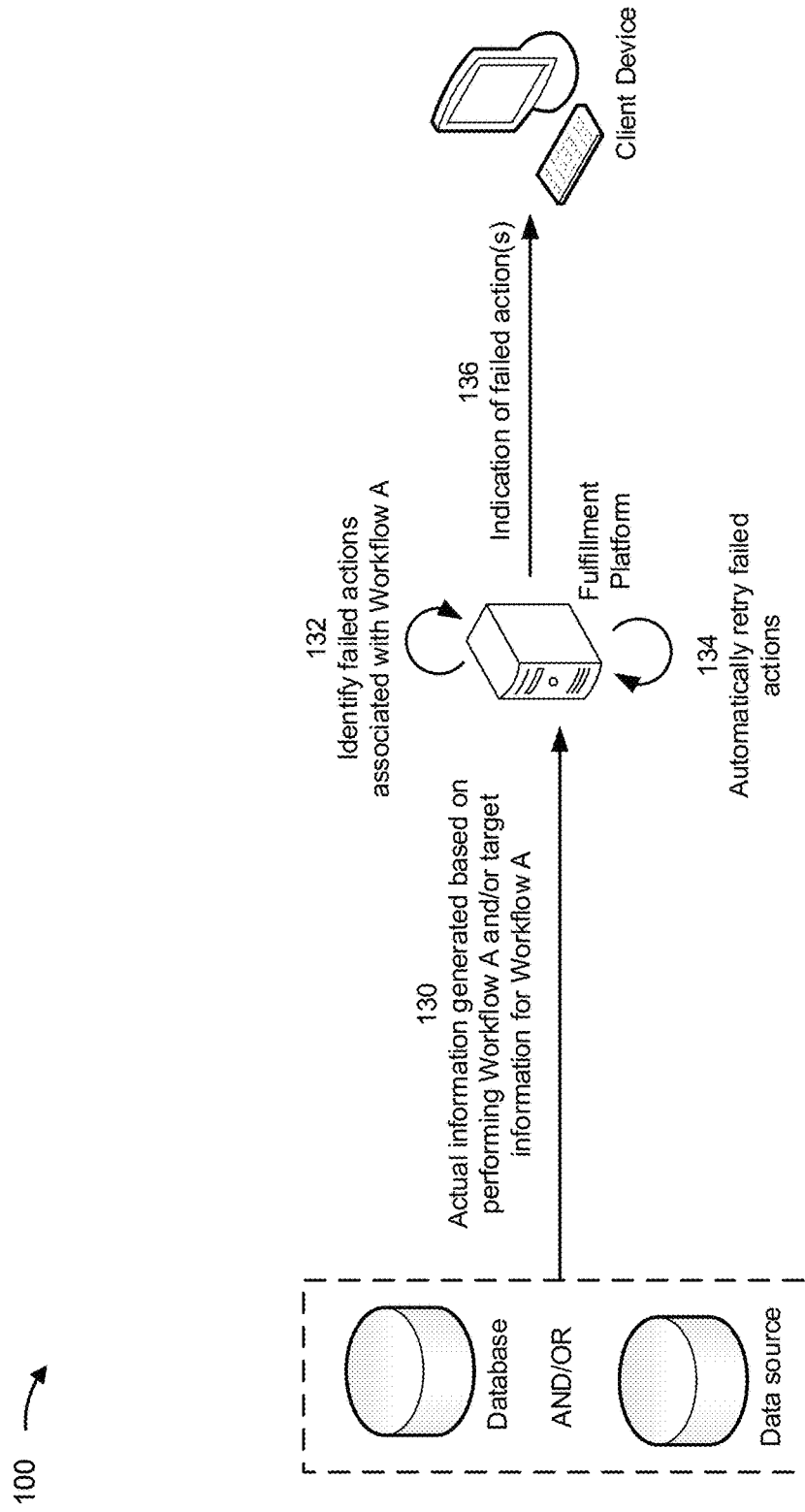

As shown in FIG. 1D, and by reference number 130, the fulfillment platform may obtain actual information generated based on performing or executing the workflow (e.g., Workflow A) and/or the target information for the workflow (e.g., Workflow A). The actual information may be used by the fulfillment platform to determine if the workflow has been successfully completed by comparing the actual information to the target information. The actual information generated based on performing or executing the workflow may be obtained from a source of truth (e.g., a database and/or a data source). The source of truth may be a location (e.g., a single source of truth) that stores or includes the actual information generated based on performing or executing the workflow. For example, the source of truth may be a data source that includes the actual information associated with the workflow. In some implementations, the source of truth may be a database that stores the actual information associated with the workflow. In some implementations, the source of truth may be the one or more outputs identified by the monitoring record associated with the workflow attempt.

As shown by reference number 132, the fulfillment platform may identify one or more failed actions associated with the workflow and/or identify that the workflow has failed. In some implementations, the fulfillment platform may determine whether one or more actions associated with the workflow have failed and/or determine whether the workflow has failed a number of times after attempting to perform or execute the workflow. For example, the fulfillment platform may attempt to perform or execute the workflow at a first time and may determine whether one or more actions associated with the workflow have failed and/or determine whether the workflow has failed at a second time (e.g., one or more days after the first time). This may enable downstream devices or processes to perform actions associated with the workflow. For example, a workflow may require a second device to perform an action and/or a second process or workflow to be performed. If the fulfillment platform determined whether one or more actions associated with the workflow have failed and/or determined whether the workflow has failed immediately after (or shortly after) attempting to perform or execute the workflow, then the downstream devices and/or processes may not have enough time to be complete actions associated with the workflow. As a result, the fulfillment platform may incorrectly determine whether one or more actions associated with the workflow have failed and/or determine that the workflow has failed. By determining whether one or more actions associated with the workflow have failed and/or determining whether the workflow has failed a number of times after attempting to perform or execute the workflow, the fulfillment platform may improve the accuracy and/or the ability of the fulfillment platform to identify the failed actions and/or the failed workflow.

The fulfillment platform may identify one or more failed actions associated with the workflow and/or identify that the workflow has failed based on the monitoring record stored by the fulfillment platform. For example, the fulfillment platform may identify a failed action based on a status indication (e.g., success or failed) indicated by the monitoring record. In some implementations, the fulfillment platform may identify a failed action or failed workflow based on comparing an output indicated by the monitoring record to the target information associated with the action and/or the workflow. If the output matches or is the same as the target information, then the fulfillment platform may determine that the action and/or the workflow was successfully completed. If the output does not match or is different than the target information, then the fulfillment platform may determine that the action and/or the workflow was not successfully completed.

Additionally, or alternatively, the fulfillment platform may identify a failed action or failed workflow based on comparing the actual information (e.g., generated based on performing the action and/or workflow) to the target information associated with the action and/or the workflow. If the actual information matches or is the same as the target information, then the fulfillment platform may determine that the action and/or the workflow was successfully completed. If the actual information does not match or is different than the target information, then the fulfillment platform may determine that the action and/or the workflow was not successfully completed.

As shown by reference number 134, the fulfillment platform may automatically retry any identified failed actions or workflows (e.g., at the second time after attempting to perform or execute the workflow at the first time, as described above). For example, the fulfillment platform may attempt to execute code for a failed action at the second time. If a workflow was terminated based on identifying a failed action (e.g., as described above), then the fulfillment platform may attempt to execute code for the failed action at the second time and may proceed with subsequent actions in the workflow if the fulfillment platform determines that the failed action is successfully completed at the second time. In some implementations, if the fulfillment platform identifies a failed action and/or failed workflow (e.g., based on comparing the actual information to the target information), then the fulfillment platform may attempt to perform or execute the failed action(s) (or each action) included in the workflow at the second time. By automatically retrying failed actions and/or failed workflow attempts, the fulfillment platform may be enabled to successfully perform the previously failed actions or workflows without requiring any additional inputs, API calls, and/or requests from the client device. This conserves resources that would have otherwise been used to communicate requests to perform the failed actions and/or failed workflow attempts. Moreover, this improves a probability that the requested workflows are successfully completed by the fulfillment platform.

In some implementations, the fulfillment platform may identify failed actions and/or failed workflow attempts (e.g., as described above in connection with reference number 132) and automatically retry any identified failed actions and/or failed workflow attempts (e.g., as described above in connection with reference number 134) multiple times at different times. For example, the fulfillment platform may identify failed actions and/or failed workflow attempts and automatically retry any identified failed actions and/or failed workflow attempts after 1 day, after 3 days, after 30 days, and/or after 60 days. This improves a probability that the requested workflows are successfully completed by the fulfillment platform.

As shown by reference number 136, the fulfillment platform may transmit an indication of failed actions and/or failed workflow attempts to the client device. The fulfillment platform may transmit a report of all failed actions and/or all failed workflow attempts identified by the fulfillment platform to the client device. In some implementations, the fulfillment platform may transmit an indication of failed actions and/or failed workflow attempts to the client device that the fulfillment platform was unable to complete after retrying one or more times (e.g., as described above). In some implementations, the fulfillment platform may transmit an indication of one or more failed actions and/or one or more failed workflows to an address (e.g., an email address) or a device associated with the one or more failed actions and/or one or more failed workflows (e.g., indicated by the action information or the workflow information). In some implementations, the fulfillment platform may periodically (e.g., once each day, once each week, and/or once each month) transmit a report of failed actions and/or failed workflow attempts identified by the fulfillment platform. In some implementations, the report of failed actions and/or failed workflow attempts identified by the fulfillment platform may indicate one or more manual actions that can be performed by a user of the client device to remedy or resolve the failed actions and/or failed workflow attempts.

This may enable a user of the client device to access and/or inspect the failed action and/or the failed workflow. For example, the user may be enabled to use the client device to access or obtain the monitoring record associated with the workflow attempt that included a failed action. In some implementations, the fulfillment platform may generate a user interface indicating the failed actions and/or failed workflow attempts identified by the fulfillment platform. The user interface may be provided to the client device for display. The user of the client device may interact with the user interface to identify and/or inspect the failed actions and/or failed workflow attempts identified by the fulfillment platform. The user interface may provide inputs via the user interface to indicate actions to be performed by the fulfillment platform to remedy or resolve the failed actions and/or failed workflow attempts. By transmitting the indication of the failed actions and/or failed workflow attempts to the client device, the fulfillment platform enables a user of the client device to quickly identify, inspect, and/or remedy the failed actions and/or failed workflow attempts.

As a result, the fulfillment platform provides a common platform that can be leveraged to create custom workflows from a set of actions stored by the fulfillment platform. This enables a user to leverage existing infrastructure provided by the fulfillment platform to create, test, and/or deploy custom workflows that can be performed by the fulfillment platform. Additionally, the fulfillment platform provides uniform monitoring across multiple workflows, ensuring that the workflows are successfully completed and/or that failed workflow are quickly reported.

As indicated above, FIGS. 1A-1D are provided as an example. Other examples may differ from what is described with regard to FIGS. 1A-1D.

Figure 2:
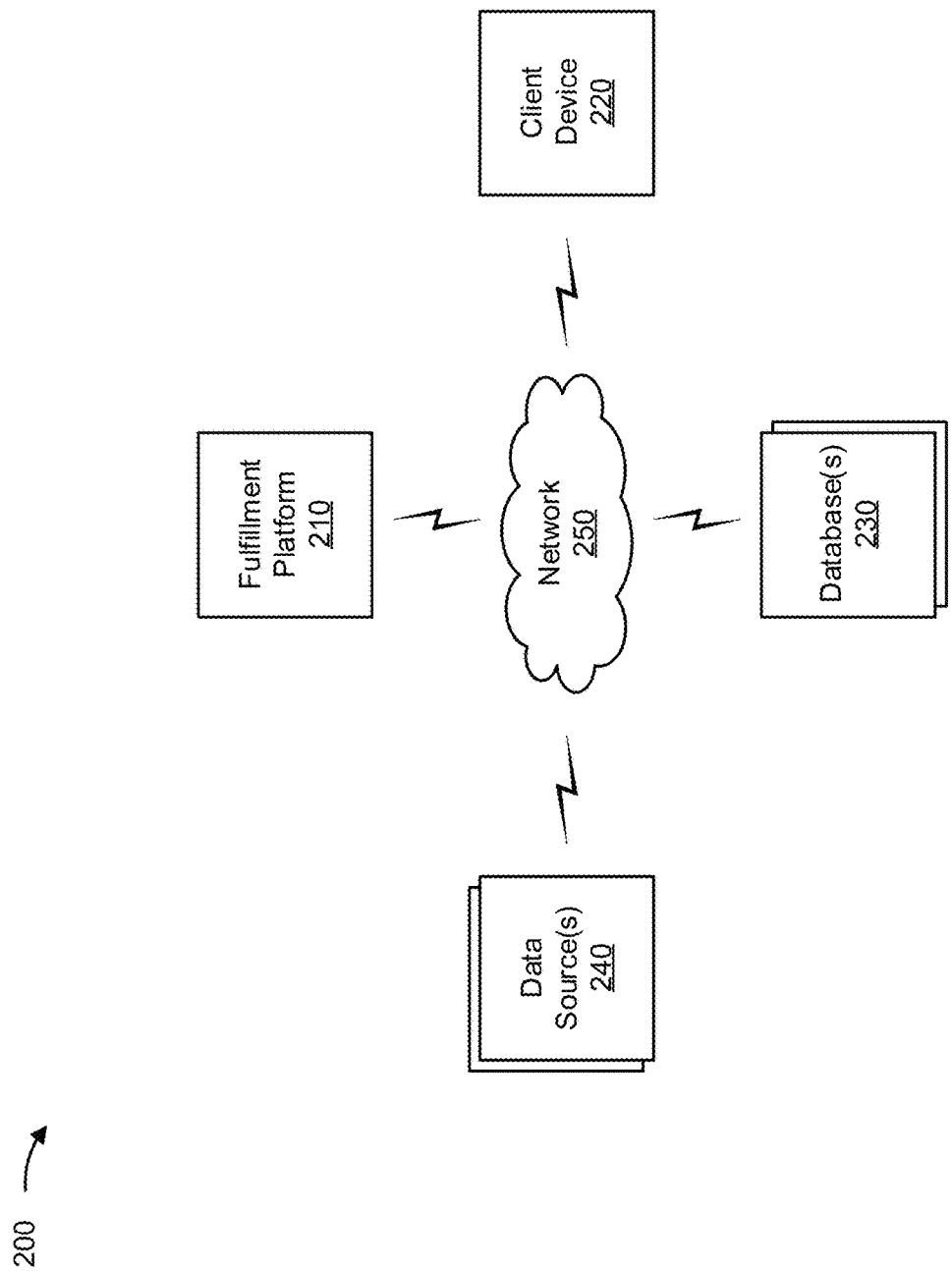
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a fulfillment platform 210, a client device 220, one or more databases 230, one or more data sources 240, and a network 250. Devices of environment 200 may interconnect via wired connections, wireless connections, or a combination of wired and wireless connections.

The fulfillment platform 210 includes one or more devices capable of receiving, generating, storing, processing, providing, and/or routing information associated with a common platform for fulfilling different actions or workflows, as described elsewhere herein. The fulfillment platform 210 may include a communication device and/or a computing device. For example, the fulfillment platform 210 may include a server, such as an application server, a client server, a web server, a database server, a host server, a proxy server, a virtual server (e.g., executing on computing hardware), or a server in a cloud computing system. In some implementations, the fulfillment platform 210 includes computing hardware used in a cloud computing environment. In some implementations, the fulfillment platform 210 may include an API, as described elsewhere herein.

The client device 220 includes one or more devices capable of receiving, generating, storing, processing, and/or providing information associated with different actions, different workflows, and/or monitoring reports or results of a workflow, as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

A database 230 includes one or more devices capable of receiving, generating, storing, processing, and/or providing information associated with different actions (e.g., code for different actions) and/or different workflows, as described elsewhere herein. The database 230 may include a communication device and/or a computing device. For example, the database 230 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 230 may communicate with one or more other devices of environment 200, as described elsewhere herein.

A data source 240 includes one or more devices capable of receiving, generating, storing, processing, and/or providing information associated with the fulfillment of different actions or workflows, as described elsewhere herein. The data source 240 may include a communication device and/or a computing device. For example, the data source 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 240 may communicate with one or more other devices of environment 200, as described elsewhere herein.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
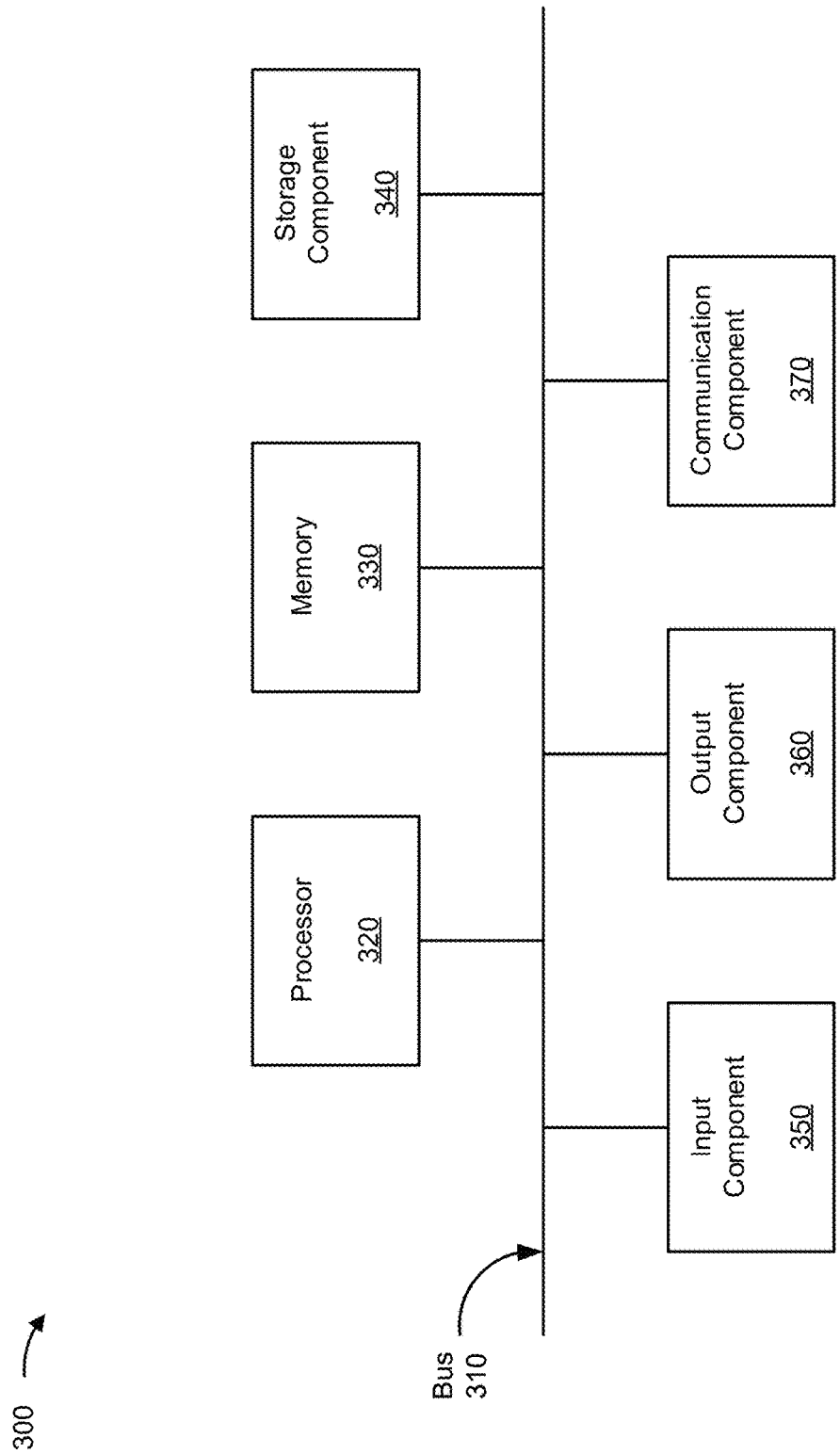
FIG. 3 is a diagram of example components of one or more devices of FIG. 2.

FIG. 3 is a diagram of example components of a device 300, which may correspond to fulfillment platform 210, client device 220, database 230, and/or data source 240. In some implementations, fulfillment platform 210, client device 220, database 230, and/or data source 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
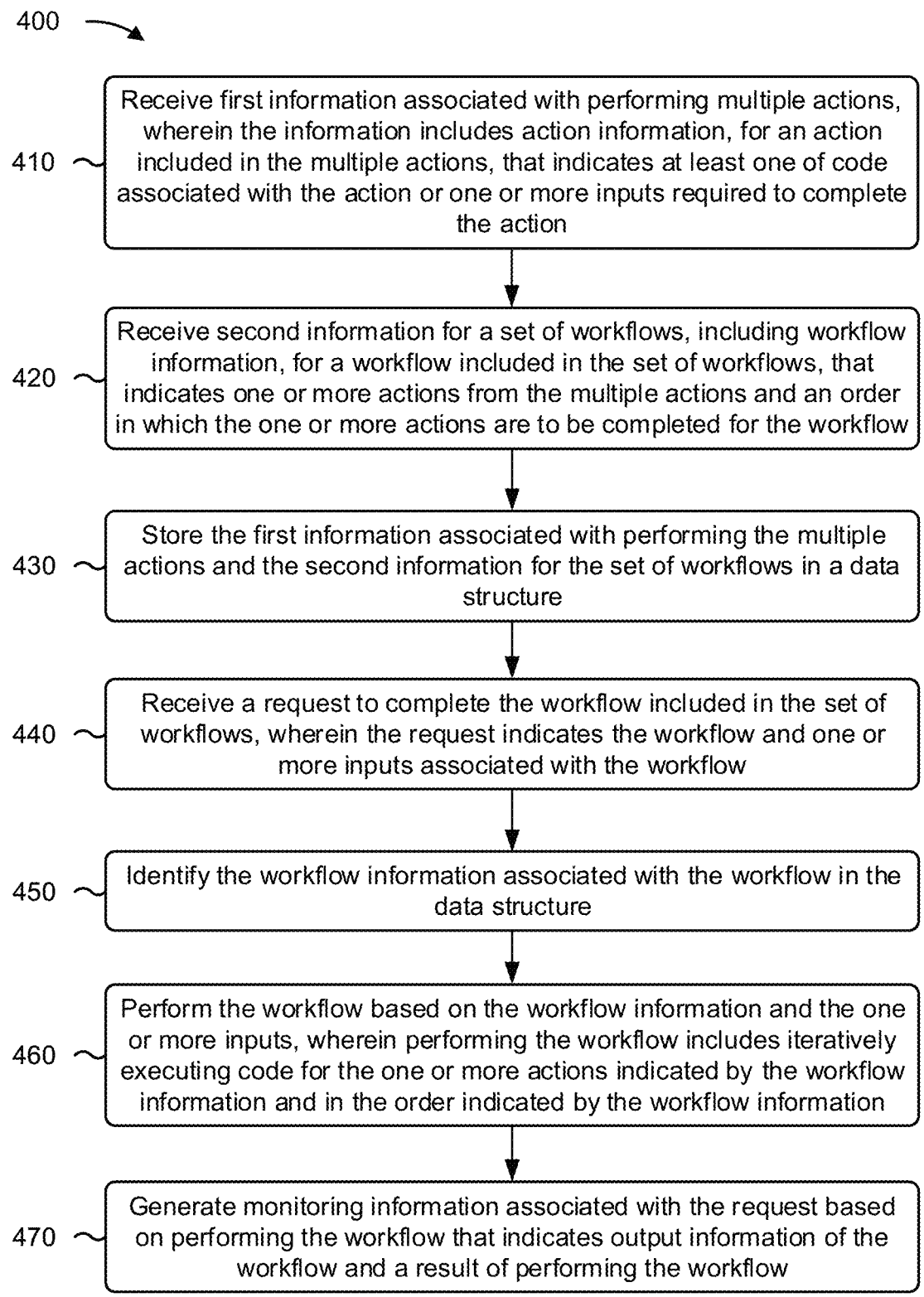
FIG. 4 is a flowchart of an example process relating to a common platform for fulfilling different actions.

FIG. 4 is a flowchart of an example process 400 associated with a common platform for fulfilling different actions. In some implementations, one or more process blocks of FIG. 4 may be performed by a device (e.g., fulfillment platform 210). In some implementations, one or more process blocks of FIG. 4 may be performed by another device or a group of devices separate from or including the device, such as client device 220, database 230, and/or data source 240. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving first information associated with performing multiple actions (block 410). In some implementations, the information includes action information, for an action included in the multiple actions, that indicates at least one of code associated with the action or one or more inputs required to complete the action. As further shown in FIG. 4, process 400 may include receiving second information for a set of workflows, including workflow information, for a workflow included in the set of workflows, that indicates one or more actions from the multiple actions and an order in which the one or more actions are to be completed for the workflow (block 420). As further shown in FIG. 4, process 400 may include storing the first information associated with performing the multiple actions and the second information for the set of workflows in a data structure (block 430). As further shown in FIG. 4, process 400 may include receiving a request to complete the workflow included in the set of workflows (block 440). In some implementations, the request indicates the workflow and one or more inputs associated with the workflow. As further shown in FIG. 4, process 400 may include identifying the workflow information associated with the workflow in the data structure (block 450). As further shown in FIG. 4, process 400 may include performing the workflow based on the workflow information and the one or more inputs (block 460). In some implementations, performing the workflow includes iteratively executing code for the one or more actions indicated by the workflow information and in the order indicated by the workflow information. As further shown in FIG. 4, process 400 may include generating monitoring information associated with the request based on performing the workflow that indicates output information of the workflow and a result of performing the workflow (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing a common application programming interface (API) for executing different procedures, the system comprising:
   one or more memories; and
   one or more processors, communicatively coupled to the one or more memories, configured to:
      store code, associated with performing an action, in an action database, wherein the action database stores code for multiple actions;
      obtain information, for a set of procedures, including procedure information for a procedure, of the set of procedures, that indicates at least one of:
         input information, associated with the procedure, that indicates one or more inputs for the API associated with the procedure,
         a set of actions, from the multiple actions identified in the action database, associated with the procedure, an order that the set of actions are to be executed for the procedure, or failure information, for each action included in the set of actions, that indicates whether the procedure is to continue if a particular action included in the set of actions fails;

receive, via an API call, a request to execute the procedure, wherein the request indicates the procedure and values or information for the one or more inputs for the API;

identify one or more parameters that indicate a quantity of requests, associated with one or more actions of the set of actions, permitted over a predetermined time period;

execute the procedure based on the one or more parameters, based on the procedure information,. and based on the one or more inputs, wherein executing the procedure includes executing code for the one or more actions; and create a monitoring record associated with the request, based on executing the procedure, that indicates information generated by executing the procedure.

2. The system of claim 1, wherein the one or more processors are further configured to:

identify, based on executing the procedure or based on the monitoring record, a failure associated with the one or more actions included in the set of actions; and automatically execute the code for the one or more actions based on identifying the failure.

3. The system of claim 1, wherein the one or more processors, when receiving the request to execute the procedure, are configured to:

receive an indication of target information associated with an expected outcome of executing the procedure.

4. The system of claim 3, wherein the one or more processors are further configured to:

compare the target information to actual information generated as a result of executing the procedure, wherein the actual information is indicated by:
the monitoring record, or
a data source that stores information associated with the procedure; and determine whether the procedure has been successfully completed based on comparing the target information to the actual information.

5. The system of claim 4, wherein the one or more processors, when determining whether the procedure has been successfully completed based on comparing the target information to the actual information, are configured to:

perform a failure operation based on determining that that the procedure has not been successfully completed, wherein the failure operation includes at least one of:
transmitting, to a device associated with the API call or associated with the procedure, an indication that the procedure has not been successfully completed, or
executing code for the one or more actions included in the set of actions.

6. The system of claim 1, wherein the one or more processors, when obtaining the procedure information for the set of procedures, are configured to:

provide a user interface to be displayed by a client device, wherein the user interface indicates information associated with the set of actions;

receive, from the client device and based on an input provided via the user interface, an indication of the procedure information for the procedure included in the set of procedures; and store the procedure information in the action database or another database.

7. The system of claim 1, wherein the one or more processors, when creating the monitoring record associated with the request, are configured to:

determine whether each action included in the set of actions has been successfully completed;

identify, for the one or more actions, one or more data points generated based on executing the code associated with the action; and create the monitoring record to include at least one of:
an indication, for each action included in the set of actions, of whether the action has been successfully completed, or
an indication, for the one or more actions included in the set of actions, of the one or more data points.

8. The system of claim 1, wherein the one or more processors, when executing the procedure, are configured to:

identify, for the one or more actions, one or more parameters associated with the one or more actions, wherein the one or more parameters include at least one of:
a cap parameter indicating a permissible number of requests associated with the one or more actions permitted over a time period, or
a rate parameter indicating a permissible rate of requests associated with the one or more actions;

determine whether the request to execute the procedure satisfies the one or more parameters; and execute code for the one or more actions if the request to execute the procedure satisfies the one or more parameters.

9. The system of claim 1, wherein the one or more processors are further configured to:

enable testing of the procedure, prior to executing the procedure, wherein the testing comprises:
receiving one or more test inputs associated with testing a particular action of the set of actions; and
providing one or more outputs based on the one or more test inputs.

10. A method for providing a generic platform for completing different workflows, the method comprising:

receiving, by a device, first information associated with performing multiple actions, wherein the first information includes action information, for an action included in the multiple actions, that indicates at least one of code associated with the action or one or more inputs required to complete the action;

receiving, by the device, second information for a set of workflows, including workflow information, for a workflow included in the set of workflows, that indicates one or more actions from the multiple actions and an order in which the one or more actions are to be completed for the workflow;

storing, by the device, the first information associated with performing the multiple actions and the second information for the set of workflows in a data structure;

receiving, by the device, a request to complete the workflow included in the set of workflows, wherein the request indicates the workflow and one or more inputs associated with the workflow;

identifying, by the device, the workflow information associated with the workflow in the data structure;

identifying, by the device, one or more parameters that indicate a quantity of requests, associated with the one or more actions, permitted over a predetermined time period;

performing, by the device, the workflow based on the one or more parameters, based on the workflow information,. and based on the one or more inputs, wherein performing the workflow includes iteratively executing code for the one or more actions indicated by the workflow information and in the order indicated by the workflow information; and generating, by the device, monitoring information associated with the request based on performing the workflow that indicates output information of the workflow and a result of performing the workflow.

11. The method of claim 10, further comprising:

identifying target information that indicates an expected outcome of performing the workflow;

comparing the target information to the output information indicated by the monitoring information; and determining whether the workflow has been successfully completed based on comparing the target information to the output information indicated by the monitoring information.

12. The method of claim 11, wherein comparing the target information to the output information indicated by the monitoring information comprises comparing the target information to the output information indicated by the monitoring information at a first time, the method further comprising:

comparing the target information to information associated with performing the workflow at a second time; and determining whether the workflow has been successfully completed based on comparing the target information to the information associated with performing the workflow at the second time.

13. The method of claim 10, further comprising:

determining, based on the workflow information, a report timing associated with transmitting a report to a client device associated with the request, wherein the report timing indicates at least one of:

that the report is to be transmitted when the device determines whether the request is valid, or that the report is to be transmitted when the device determines whether the workflow indicated by the request has been successfully completed; and transmitting, to the client device associated with the request, the report indicating whether the request is valid or whether the workflow has been successfully completed.

14. The method of claim 10, wherein receiving the workflow information for the set of workflows comprises:

generating a user interface that indicates the multiple actions stored in the data structure;

providing, to a client device, the user interface to be displayed by the client device; and receiving, from the client device, an indication of workflow information for a workflow that is based on an input provided via the user interface.

15. The method of claim 10, wherein workflow information further indicates failure information for each action associated with the workflow, wherein the failure information indicates whether the workflow can be continued if a failure of one or more actions is detected.

16. A non-transitory computer-readable medium storing a set of instructions, the set of instructions comprising:

one or more instructions that, when executed by one or more processors of a device, cause the device to:

obtain first information, for multiple actions, that includes action information for an action, included in the multiple action, that indicates code associated with executing the action and one or more inputs required to execute the action;

obtain second information, for a set of workflows, that includes workflow information for a workflow, included in the set of workflows, that indicates one or more actions from the multiple actions and an order in which the one or more actions are to be completed;

store, in a database, the first information for the multiple actions and the second information for the set of workflows;

receive, via an application programming interface (API) call, a request to complete the workflow included in the set of workflows, wherein the request indicates the workflow and one or more inputs for an API;

identify, in the database, the workflow information associated with the workflow;

identify one or more parameters that indicate a quantity of requests, associated with the one or more actions, permitted over a predetermined time period;

execute code for the one or more actions indicated by the workflow information in the order indicated by the workflow information; and generate a monitoring report associated with the request based on executing the code that indicates an outcome of executing the code for the one or more actions.

17. The non-transitory computer-readable medium of claim 16, wherein the one or more instructions, that cause the device to execute code for one or more actions indicated by the workflow information in the order indicated by the workflow information, cause the device to:

identify, for each action indicated by the workflow information, failure information indicated by the action information associated with each action;

execute code associated with a first action indicated by the workflow information;

determine that the first action was not successfully completed; and perform a failure operation indicated by the failure information associated with the first action based on determining that the first action was not successfully completed, wherein the failure operation includes:

executing code associated with a second action indicated by the workflow information if the failure information indicates that the workflow is to be continued if the first action fails; or refraining from executing code associated with the second action indicated by the workflow information if the failure information indicates that the workflow is to be stopped if the first action fails.

18. The non-transitory computer-readable medium of claim 16, wherein the one or more instructions, that cause the device to execute code for one or more actions indicated by the workflow information in the order indicated by the workflow information, cause the device to:

execute code associated with an action included in the one or more actions at a first time;

determine that the action has not been successfully completed based on executing the code; and automatically execute the code associated with the action at a second time based on determining that the action has not been successfully completed.

19. The non-transitory computer-readable medium of claim 16, wherein the one or more instructions, when executed by the one or more processors, further cause the device to:
- store the monitoring report associated with the request; and
- provide, to a client device associated with the request or another device, the monitoring report indicating at least one of:
  - whether each action associated with the workflow has been successfully completed,
  - information generated based on executing the code for the one or more actions, or
  - one or more actions to be completed using a batch processing technique.

20. The non-transitory computer-readable medium of claim 16, wherein the one or more instructions, that cause the device to obtain action information for multiple actions, cause the device to:
- obtain, for an action included in the multiple actions, an indication of at least one of:
  - information to be identified in the monitoring report for the action, or
  - whether the action is to be completed using a batch processing technique.

\* \* \* \* \*